United States Patent
Hejzlar et al.

[15] 3,656,568
[45] Apr. 18, 1972

[54] VARIABLE BALANCE-POINT COUNTING DEVICE

[72] Inventors: Sid Hejzlar; Robert M. Zweig, both of Flushing, N.Y.; Goerge D. Reynolds, Jr., New Canaan, Conn.

[73] Assignee: John Chatillon Division of Macrodyne-Chatillon Corporation, Kew Gardens, N.Y.

[22] Filed: Feb. 18, 1971

[21] Appl. No.: 116,515

[52] U.S. Cl. ............................................ 177/200, 177/224
[51] Int. Cl. ........................................................ G01g 19/00
[58] Field of Search ..................... 177/200, 216, 224, 246

[56] References Cited

UNITED STATES PATENTS

| | | |
|---|---|---|
| 106,560 | 8/1870 | Dickinson ............................ 177/216 |
| 1,446,131 | 2/1923 | Sides ................................. 177/200 X |
| 3,115,202 | 12/1963 | Langevin ............................. 177/200 |

*Primary Examiner*—Richard B. Wilkinson
*Assistant Examiner*—George H. Miller, Jr.
*Attorney*—Bryan, Parmelee, Johnson & Bollinger

[57] ABSTRACT

A counting device is provided for counting statistically uniform manufactured parts, by weight, using a self-balancing scale with a variable balance-point. A known number of parts similar to those to be counted is placed on the balancing unit of a vertical balancing arm and the unknown quantity placed in the counting unit on an opposing horizontal arm. The design principle used is such that when balance equilibrium is reached, the vertical component of downward deflection of the horizontal arm bears a direct linear relationship to the proportionate weights, and so numbers, in the two pans. Modifications serve to enhance accuracy through reduction of friction and automatic read-out.

8 Claims, 7 Drawing Figures

PATENTED APR 18 1972 3,656,568

INVENTORS.
SID HEJZLAR
ROBERT M. ZWEIG
BY GEORGE D. REYNOLDS JR.
Bryan, Parmelee,
Johnson & Bollinger.
ATTORNEYS INVENTORS
SID HEJZLAR
ROBERT M. ZWEIG
BY GEORGE C. REYNOLDS JR
*Bryan, Parmelee,
Johnson & Bollinger*
ATTORNEYS

VARIABLE BALANCE-POINT COUNTING DEVICE

BACKGROUND OF THE INVENTION

This invention relates to a variable balance-point counting device utilizing proportionate weights as a means of counting. It is, therefore, a form of scale.

In the past, most counting scales have either been spring-actuated or have been balances having a fixed ratio between the two sides of the balance. Thus, when counting parts by weighing them, the parts to be weighed would be placed on one side of the scale and a lesser number or parts on the other until balance at a fixed point was reached. The smaller number of parts would then be counted, the lever arm length determined, and the ratio of lever arm lengths used to determine the number of parts on the other side. This has the disadvantage of requiring manual balancing and counting of the parts in the balancing pan each time, with the resulting delay and risk of error.

By contrast, the device of the present invention gives a direct visual readout of number of pieces, without fixed point balancing or counting. The unit is self-balancing.

This device differs from other self-balancing counting devices known to the inventors in that it:

1. Requires no cam structure to make the unit read linearly.
2. Has infinite balance variability and, therefore, a variable ratio.
3. Has a straight, not arcuate, reading scale, which, being linear, is cheaper to manufacture and can more readily be adapted to automatic read-out systems.
4. The balancing pans may be gravity suspended, thus keeping the center of gravity always at the same point on the balance arm, or, in our modification, the same distance from the fulcrum.
5. The linearity in reading allows for optical reading, use of a differential transformer, etc., and so for direct coupling to a computer for recording, printing, remote readout, etc.

SUMMARY OF THE INVENTION

Our invention is directed to the counting of variable quantities of uniform manufactured parts, each of which has the same weight.

Our counting device has a right-angle pivoted balancing arm made up of two sections, a first balance arm which is a vertical standardizing arm and a second balance arm which is a horizontal counting arm. A balancing parts pan is mounted on each arm. The arms are counterbalanced so that the center of gravity of the entire system, i.e. arms and pans, is located at the fulcrum of rotation.

A known number of parts to be weighed is placed in the standard parts pan on the vertical standardizing arm and a larger unknown number on the counting parts pan on the horizontal counting arm. This causes the horizontal arm to drop and so to move the vertical arm off-center. When it is sufficiently off-center the two arms are then in balance. As will be shown below, the mathematics of the present structure, as used in deflection measurement, is such that the extent of the vertical displacement of the horizontal arm, as measured on a fixed vertical line is in a direct linear relationship to the proportion of the weights in the two pans.

Thus, it can be seen that by putting a given number of parts in the standard parts pan, and counting them but once, one can weigh varying amounts of articles in the counting parts pan on the horizontal counting arm, and so determine the number of articles in it by virtue of the variable balance point.

THE DRAWINGS

Turning to the drawings.

DETAILED DESCRIPTION OF THE INVENTION

Figure 1:
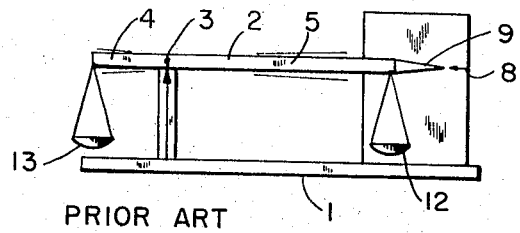
FIG. 1 is a simple counting device of a type used in the prior art, having a single balance point, and is shown for comparison purposes.

FIG. 1 is simply a drawing of the prior art showing one of the common methods of counting by weighing. In this instance a simple balance 1 is used having a balancing arm 2 on a fulcrum 3. Balancing arm 2 has a fixed ratio between the lengths of the shorter section of the arm 4 and the longer section 5. A balance point 8 has been shown at the end of the arm 5 having a pointer 9 as an extension of arm 5 pointing to balance point 8. Point 8 would usually just be a simple identification of the balance point.

In use, the scale of FIG. 1 would have a known small quantity of objects to be counted, such as nuts, or bolts, or the like, placed in the pan 12 suspended from arm 5. A larger number of the same items, to be counted, would be placed in pan 13. The number of items in pan 12 is adjusted until the unit balances. The number of items in pan 12 is then counted and is multiplied by the ratio of the length of the two arms 4 and 5 to determine the number of items that was in pan 13. Thus, by weighing, the items have been counted.

Figure 2:
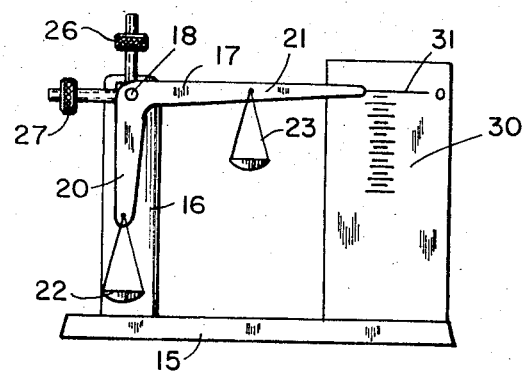
FIG. 2 is an elevation of the device of our invention showing the linear relationship for determining proportions.

The device of our invention is shown in FIG. 2. It includes a base 15, having an upright portion 16 for pivotally supporting the balance arm 17. As shown, the fulcrum for the balance arm is pivot or bearing 18.

Balance arm 17 is composed of a first standardizing arm 20 extending vertically and a second, horizontal counting arm 21, the arms being at right angles to one another. Each arm has a weighing pan mounted on it. Standard parts pan 22 is suspended from standardizing arm 20, and counting parts pan 23 from counting arm 21. The arms also have adjustable counter-balancing weights on the opposite side of the fulcrum from the arms. Arm 20 has weight 26, and arm 21 has weight 27. These weighs 26 and 27 are adjusted during manufacturing so that the entire system, consisting of balance arm 17, pans 22 and 23, and weights 26 and 27, is balanced in respect to fulcrum 18.

Also mounted on base 15 is a scale 30 to be read by a pointer 31 which is an extension of arm 21. Scale 30 is a vertical scale and, as will be shown below, will read the proportion between the weights in pans 22 and 23 linearly, and so may be calibrated in terms of either numbers or proportions.

In use, the unknown quantity of uniform manufactured parts is placed in pan 23, and the known quantity of similar parts, in pan 22. This causes swinging deviation of arm 17 to a balance point. The ratio between the two quantities determines the amount of deviation and is ascertained by reading the position of pointer 31 on scale 30.

Figure 3:
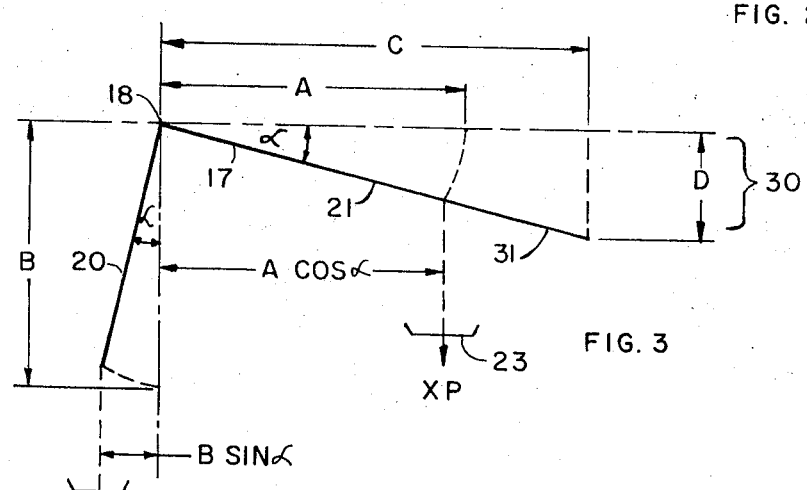
FIG. 3 is a diagram showing the mathematical relationships of the standard and counting arms so that the theory of the invention can be explained.

Before describing the operation in more detail, however, it is important to review the underlying concepts. The trigonometric diagram in FIG. 3 has been provided for this purpose. Where appropriate, the numbers used in FIG. 3 are similar to those of FIG. 2. It will be seen that as counting arm 21 drops due to the weight of the items in it, standardizing arm 22 rotates to the left (clockwise) and so moves the weight carried in pan 22 a horizontal distance to the left of the fulcrum 18 until equilibrium is reached. The horizontal distance to the left of fulcrum 18 is the length of the effective lever arm.

As arm 17 rotates in a clockwise direction, the horizontal component of the standardizing arm 20 increases in length and the horizontal component of counting arm 21 decreases until, at some point, they have gone sufficiently far so that the scale has balanced. The distance they move will, of course, depend upon the relative weights in pans 22 and 23 and the respective lengths of arms 20 and 21. These factors permitted us to develop a concept which could be used to devise our counting device.

In FIG. 3 the angle $\alpha$ is shown as representing the angle of rotation of the arms to reach the balance point. It can be seen, then, that if the length of lever arm 20 is B, then the horizontal component of lever arm 20 at the point of balance will be
$$B \sin \alpha$$
Comparably, if the length of arm 21 is A then the horizontal component of arm 21 will be
$$A \cos \alpha$$
If P represents the weight of an individual part, and N the number of parts in pan 22, then NP will represent the weight in pan 22. Similarly, if X is the unknown number of parts in pan 23, then XP will be the weight of those parts in pan 23, since the individual parts each have the same weight. We can, therefore, prepare a balancing equation in which the horizontal lengths of each lever arm times the weight carried by the lever arms are equated. This would then give
$$XPA \cos \alpha = NPB \sin \alpha$$
Solving this, the number of parts in pan 23 to be counted would be given by
$$X = NB \sin \alpha / A \cos \alpha$$
$$= NB/A \tan \alpha$$

Turning again to FIG. 3, some additional relationships can be noted for balance equilibrium. The scale 30 is a vertical scale which is a given distance from the fulcrum 18. This distance may be identified as C and, of course, is a constant. The deflection of pointer 31 on scale 30 is a vertical distance D. Thus, it will be observed that
$$\tan \alpha = D/C$$
Substituting this in the above equation for X, we find that
$$X = NB/AC \cdot D$$
Since B/AC is a chosen constant, it can be identified as K. Then
$$X = KDN$$
Therefore, the deflection on scale 30 as shown by pointer 31 has a direct linear relationship to the number of items being weighed in pan 23. Accordingly, scale 30 can be calibrated in numbers and read directly, if N = 1, or the indicated number is simply multiplied by N, if the chosen quantity N is larger than one (for example if N = 10, multiply displayed dial reading times 10), and the advantages listed above have been achieved. It will also be noted that the scale 30 is relatively inexpensive to manufacture since it is a straight, not arcuate scale, and is linear in its calibration.

Scale 30, as shown in FIG. 2 is mounted firmly with respect to base 15, and readings are obtained visually at points of intersections between the pointer line and the vertical dial line is represented by D in FIG. 3. In a similar manner the distance D could be sensed by a vertically guided follower rod, which travels at a fixed distance C, until it rests on the horizontal arm 21 of beam 17. Being that its desired motion is vertical, its own weight would be its propelling force. This follower could be equipped with a linear gear rack which in turn would rotate a pointer affixed to a mating gear pinion, so that said pointer would travel along a fixed circular dial, the amount of its travel being directly proportional to the ratio of counted pieces.

Figure 4:
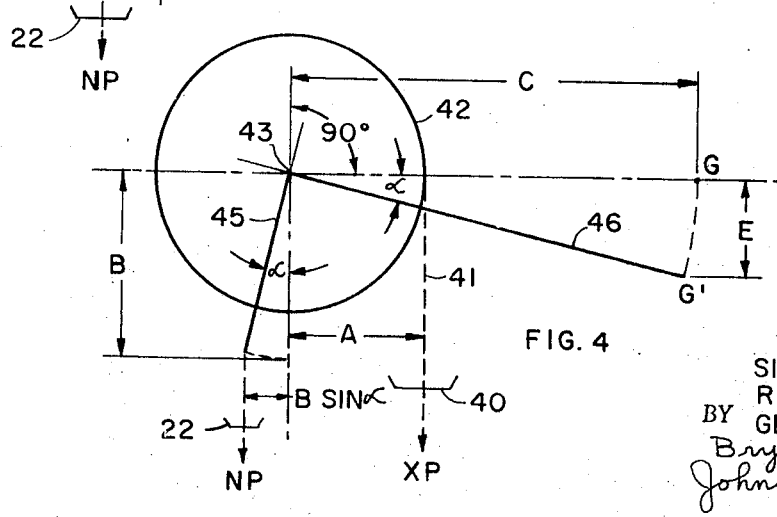
FIG. 4 is a similar diagram showing the mathematical relationships between the standard arm and the counting arm for a modification of our invention.
Figure 5:
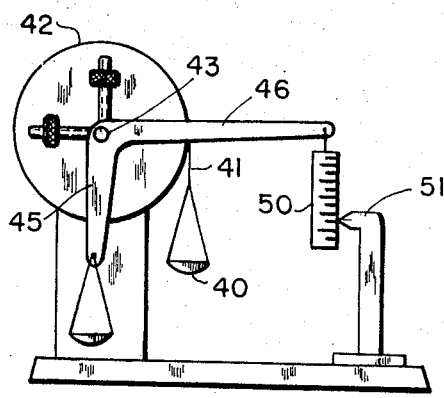
FIG. 5 is an elevation of the modification of our invention, of FIG. 4.

FIGS. 4 and 5 disclose a slight modification of our invention, FIG. 4 showing the theory in a manner akin to the showing of FIG. 3, and FIG. 5 showing a structure utilizing that theoretical approach.

The essential difference in theory between the previously disclosed counting device and the modification is that in the previous disclosure the counting pan 23 varies in horizontal distance from fulcrum 18 as horizontal counting arm 21 is depressed from the horizontal. This distance, as shown in FIG. 3 would be
$$A \cos \alpha$$

The reading, in the structure of FIGS. 2 and 3, then, would be on a vertical scale that is affixed to the base at a constant horizontal distance from the fulcrum.

In the modification of FIGS. 4 and 5, however, the horizontal distance of the weighing pan remains constant, but the horizontal distance of the reading scale from the fulcrum varies.

The counting pan, identified as 40 in FIG. 4 is suspended from a belt 41 that passes around a block or pulley 42. Block 42 has a common fulcrum with arms 45 and 46, comparable to arms 20 and 21 respectively, and moves with them. The remaining structure is the same as in FIG. 2.

Using the same symbols as used in discussing FIG. 3, and having A represent the radius of block 42, the conceptual calculations are then as follows:
$$XPA = NPB \sin \alpha$$
$$X = NB/A \sin \alpha$$
Since, as can be seen from inspection of FIG. 4,
$$\sin \alpha = E/C$$
where E is the vertical distance of travel of a point G on the arm 46 at a distance C from the fulcrum, we can then combine these equations giving
$$X = NB/AC \cdot E$$
Since B/AC, like in previous description in FIG. 3, is a chosen constant K,
$$X = KEN,$$
therefore, the unknown quantity X is directly proportional to distance E, N being the known quantity in pan 22.

The major difference between the structures of FIGS. 2 and 5 is the method of relating the self-balancing motions of the two systems in regard to their visual manifestations. Whereas in FIG. 3 the motion of the balance beam is measured by means of a fixed vertical scale and a traversing pointer, the structure of FIG. 4 is more adaptable to those situations, in which it is desirable that the scale is freely suspended from a point G on the arm 46, therefore, the scale itself is moving in reference to a stationary pointer.

FIG. 5 shows a counting device using the principles of FIG. 4. Except for the method of suspending counting pan 40, it is similar to the structure of FIG. 2. Vertical standardizing arm 45 and horizontal counting arm 46 are at right angles to one another and pivoted at fulcrum 43. Secured to the arms is block or pulley 42 carrying a belt 41 with counting pan 40. As the arms rotate clockwise, when in use, to reach equilibrium belt 41 unwinds slightly, but the horizontal distance of belt 41 and so pan 40 from the fulcrum remains a constant.

The deflection is again measured on a vertical scale 50 through pointer 51, but now the pointer is affixed to the base and the linear dial is suspended from the arm 46. Due to the free suspension, the horizontal graduation lines on the scale remain horizontal throughout the arcuate motion of the beam. The pointer must be long enough to allow for the horizontal shift of the graduation band toward the fulcrum. (For example, a long horizontal hairline pointer extending sufficiently beyond the left edge of graduations.) This system is particularly suited for reading by means of an optical projection. The scale is photographed on a transparent film and is suspended from the point G. A light source and a projection lens system are rigidly mounted to the base so that the created beam of light passes through the film and onto a stationary projection screen. The screen is inscribed with a horizontal line, which serves as a pointer at which readings are taken. The advantages of such an optical system are its inherent magnification and its contactless, therefore, frictionless, transmission.

We turn now to methods of actually reading the scale deflection, other than simple visual methods. Various methods may be used for self-reading. Typical of these is the differential transformer system of FIG. 6 and the photodetector system of FIG. 7.

Figure 6:
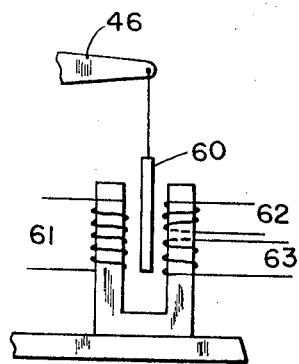
FIG. 6 is a drawing of one method of automatically reading the results of a weighing count by using a differential transformer.

In FIG. 6 the suspended scale 50 has been replaced by the induction coupling core 60 of a differential transformer. The stationary transformer body has the usual primary winding 61 and two opposing secondary windings 62 and 63. An alternating electrical current, which is passed through the primary winding 61, induces voltages in the secondary coils 62 and 63. Their relative magnitudes depend upon the physical position of the coupling core 60, therefore, an UP/DOWN movement will alter their ratios proportionally. The resulting electrical output can then be connected to any form of desired actuating device, such as a label printer, computer memory for inventory purposes, computer billing system, etc.

Figure 7:
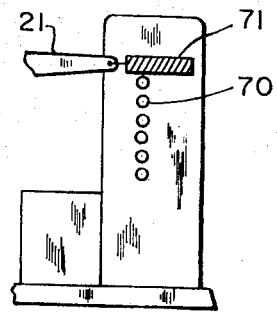
FIG. 7 is another method of reading using a photo-detector.

In FIG. 7, the reading occurs through use of a photo-detector. This may take any of various forms, but as shown, the calibrated scale has been replaced by a vertical slit 70 having a photodetector, not shown, behind it. Arm 21 carries an opaque screen 71 which blocks out varying proportions of slit 70, depending upon the deflection of arm 21. Consequently, the light received by the photodetector will vary with the deflection of arm 21, and the output of the photodetector will relate to the deflection.

It will be realized, of course, that whether the reading system of FIG. 6, FIG. 7, or some other method is used, the arms must be counterbalanced to compensate for the structure used for obtaining the read-out, so that the center of gravity is always concentrated in the fulcrum of rotation. It is also interesting to observe, that the system of FIG. 6 is adaptable to the structure of FIG. 4, whereas the system of FIG. 7 needs the structure of FIG. 3.

In considering the structure and method of out invention, several features that should be noted are: that the two arms 20 and 21 (and 45 and 46) should be exactly at a 90° angle to one another, that the deflection of the two arms should be in the same plane, and that the entire moving system is balanced in relation to the fulcrum.

By use of our invention a linear reading of numbers is directly obtained with no intervening need for cams or the like; the unit has infinite variability because the scale is linear and can be read at any point on the scale and the number of counterbalancing parts laced in pan 22 can be varied; that the unit has a straight, not arcuate reading scale, that the balancing pans are so suspended, that the center of gravity of the unit, when empty, is always at the fulcrum, and that forces of the weights in the pans are always applied at the desired positions.

What is claimed:

1. A variable balance point device for ascertaining the number of a variable quantity of uniform manufactured parts, utilizing the force of gravity without the use of a spring, comprising:

a support frame,
a pivot on said support frame,
arm means pivotally mounted upon said pivot for swinging motion about said pivot,
said arm means defining a first balance arm extending generally vertically downwardly from said pivot,
a standard parts pan mounted on said first balance arm,
said standard parts pan being adapted to hold a predetermined number of said manufactured parts for providing a standard of comparison,
said arm means also defining a second balance arm extending generally horizontally from said pivot,
a counting parts pan mounted on said second balance arm,
said counting parts pan being adapted to hold a variable unknown quantity of said manufactured parts, and reading means providing a scale cooperating with said arm means for indicating the extent of swinging deviation of said arm means away from a predetermined initial position in which said second arm was extending generally horizontally to a variable balance point in which said arm means are swung away from said initial position by an extent of swinging movement which becomes greater when a larger unknown quantity of said manufactured parts are placed in said counting parts pan,
thereby ascertaining the number of said unknown quantity of manufactured parts by the resultant deviations.

2. A device as set forth in claim 1 in which said parts pans are pivotally suspended from their respective arms.

3. A device as set forth in claim 1 in which said means for indicating the extent of swinging deviation includes a differential transformer.

4. A device as set forth in claim 1 in which said means for indicating the extent of swinging deviation is a photodetector system.

5. A device as set forth in claim 1 in which the mount on said second balance arm for said counting parts pan includes means for holding said counting parts pan at a constant horizontal distance from said pivot.

6. A device as set forth in claim 5 in which said means for holding said counting parts pan at a constant horizontal distance from said pivot includes a suspending pulley having a common axis with said arms, a belt thereabout, and in which said counting parts pan is mounted on said second balance arm by being suspended from said belt.

7. A device as set forth in claim 1 in which said means for indicating said deviation is a vertically oriented scale and said deflection is measured vertically.

8. A device as set forth in claim 7 in which said vertical deflection measurement is of a fixed point on said second balance arm.

* * * * *